United States Patent Office 3,371,069
Patented Feb. 27, 1968

3,371,069
FILAMENTS AND SURGICAL SUTURES OF POLY-L-GLUTAMIC ACID PARTLY ESTERIFIED WITH LOWER ALKANOLS AND PROCESS THEREFOR
Takashi Miyamae, Kawasaki-shi, Kanagawa-ken, and Shigeo Mori and Yoshifumi Takeda, Tokyo, Japan, assignors to Ajinomoto Co., Inc., Tokyo, Japan
No Drawing. Filed Mar. 17, 1964, Ser. No. 352,670
Claims priority, application Japan, Dec. 5, 1963, 38/65,057; Dec. 10, 1963, 38/66,055; Mar. 20, 1963, 38/13,285
6 Claims. (Cl. 260—78)

This invention relates to synthetic surgical sutures, and more particularly to sutures which may be employed in the bodies of warm-blooded animals and are absorbed by the body tissues after having performed their task.

Catgut of animal origin is the only surgical suture material commercially available at this time, which is absorbed by the body after a sufficient time to permit the sutured connection to heal. The material is not readily produced in uniform quality, and is relatively inconvenient to handle when compared with such suture materials as silk or synthetic fibers which are not capable of being absorbed by body tissue.

A suture material adapted for use in portions of the body not later accessible for removal of the sutures should meet the following requirements:

(1) It should have adequate initial tensile strength, and retain this strength until healing has progressed sufficiently to make the suture unnecessary.
(2) It must be capable of being sterilized without degeneration and without significant loss of tensile strength.
(3) It should provoke as small an immune reaction as possible.
(4) It should have good handling qualities, such as resilience, smoothness and pliability.
(5) It must be non-toxic and compatible with living tissue.

We have found that filaments or yarns consisting of poly-L-glutamic acid partly esterified with lower alkanols meet the requirements for absorbable sutures. A portion of the glutamic acid radicals in the polymeric material may be replaced by those of other physiologically tolerated amino acids without altering the basic properties of the suture material of the invention and the term "glutamic acid" as employed hereinafter will be understood generally to include such copolymers in which glutamic acid predominates or amounts to at least 50% of the repeating units of the macromolecules.

Filaments of polyglutamic acid are prepared in a known manner by extruding aqueous solutions of water-soluble salts of the acid into an acid coagulation bath in which the free acid is insoluble. Polyglutamic acid is non-toxic, compatible with body tissue and readily absorbed by animal tissue. It has repeating units of the formula

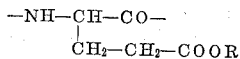

wherein R is a hydrogen and may be replaced by alkyl to form poly-γ-alkyl-glutamates. Thin filaments of polyglutamic acid are digested within 24 hours by blood serum and by ascitic fluid. Human skin absorbs implanted poly-L-glutamic acid filaments within 48 hours. Polyglutamic acid filaments thus are not suitable as surgical sutures.

When filaments of adequate strength for service as sutures are prepared in the usual manner from a poly-γ-alkyl-glutamate, the sutures are not absorbed in a sufficiently short period to make them useful for the intended purpose. A 600 denier yarn of poly-γ-ethyl-L-glutamate fastened in the intestinal tract of a dog remained unchanged for about two months, and the first superficial changes due to digestion were found only after almost three months. Poly-γ-alkyl-L-glutamate yarns thus are useful as absorbable sutures only where absorption over a period of six months or more is desired.

We have found that sutures absorbed by the bodies of warm-blooded animals in the periods normally required in surgery can be produced from glutamic acid filaments by partially esterifying the free carboxyl radicals of the polymeric acid, or by superficially esterifying the filaments. The time required for absorption of a partly esterified polyglutamic acid filament or yarn in an animal body may be controlled by varying the degree of esterification, and the conditions under which esterification takes place.

Polyglutamic acid filaments whose surfaces are esterified maintain their tenacity and other mechanical properties almost unchanged over extended periods if kept dry. When the filaments are in contact with body tissue, the superficial layer of ester is gradually removed. The exposed free polyglutamic acid is then quickly broken down by enzymes present in the body, and is dissolved.

The basic material of the sutures of our invention thus is a polymer having repeating units which are radicals of L-glutamic acid, and may additionally have repeating units which are radicals of other physiologically tolerated amino acids, as L-alanine and L-valine. The repeating units are connected by α-peptide linkages. The glutamic acid radicals in a surface layer of the sutures are at least partly esterified with lower alkanols, more specifically with methanol, ethanol, or either of the propanols.

The filamentous polymeric acid material may be esterified by conventional methods, and esterification is carried out most conveniently by contacting the acid material with the alcohol in the presence of a catalyst which is capable of providing hydrogen ions, as is conventional in itself. The non-oxidizing strong mineral acids, such as sulfuric or hydrochloric acid, and strong organic acids, such as toluenesulfonic acid, may be employed.

The rate of esterification depends on the temperature and time of contact between the polymeric amino acid filaments and the alcohol, and the resistance of the sutures to absorption by the body is primarily controlled by the degree of esterification although the distribution of the remaining free carboxyl groups has a significant influence on the absorption of the partly esterified material by the body.

We have further found that the esterification properties of the acid polymer and the rate of absorption of the polymeric ester are greatly influenced by mechanical treatment of the acid prior to esterification, and of the ester prior to exposure to body fluids. It has been found that stretching of polyglutamic acid filaments reduces the rate at which the filamentous material is esterified under otherwise identical conditions. Alkyl polyglutamate filaments or films are readily absorbed when implanted in body tissue of warm-blooded animals unless the ester material is subjected to stretching prior to implantation. The mechanical working of the ester material in normal yarn preparation is sufficient to make the yarn resistant to body fluids over extended periods.

Polyglutamic acid combines very slowly with the lower alkanols in the presence of a strong acid at room temperature. In order to increase the rate of esterification, it is necessary to operate with a large excess of the relatively inexpensive alcohol, and at elevated temperatures which significantly affect the strength of the esterified filaments when applied for more than a few minutes.

When polyglutamic acid filaments of 150 deniers are stretched 200% prior to esterification, and are esterified in an excess of ethanol at 80° C. in the presence of sulfuric acid until about one half of the available carboxyl groups are esterified (50% degree of esterification), more than 20 percent of the original dry tenacity may be lost. We believe that the polyglutamic acid material becomes partly crystalline by stretching, and that only the amorphous portion of the material is readily esterified. Esterification of the crystalline portion can only be achieved under conditions of temperature and time severe enough to lower the mechanical strength of the filaments.

To obtain high tensile strength in the partly esterified polyglutamic acid structure, we avoid stretching of the polyglutamic acid filaments prior to esterification by more than 100 percent, and preferably do not stretch the polyglutamic acid filaments more than 50 percent prior to esterification.

If the glutamic acid radicals in the peptide chains of the filaments are partly replaced by other amino acids, the mechanical treatment of the polymeric acid filaments influences the esterification rate in the same manner as with filaments consisting entirely of polyglutamic acid, and the mechanical strength of the esterified copolymer filaments is affected by the esterification conditions in the same way.

Adequate mechanical strength cannot normally be achieved in polymeric amino acid yarns or polymeric amino acid ester yarns without orienting the peptide chains by stretching. Filaments spun from alkylpolyglutamates and stretched for mechanical strength in the usual manner cannot normally be employed as suture material because of their low rate of absorption in the body, as has been pointed out hereinabove. The alkylpolyglutamate filaments, however, have very desirable moisture resistance in storage, which is not possessed to the same extent by superficially esterified polyglutamic acid filaments. It is believed that a sufficient number of superficial carboxyl groups remains available after polymerization to affect the wet tenacity of the partly esterified polyglutamic acid filaments.

We have found that a cast film or filaments or poly-$\gamma$-alkyl-L-glutamate produced without stretching may be implanted in the back muscles of a mouse, and is completely digested within about 90 days. It does not swell in the tissue by water absorption.

Similarly, a filament of partly esterified polyglutamic acid, or of a partly esterified copolymer of glutamic acid with other amino acids, is protected against moisture absorption and swelling from its surroundings by a coating of absorbable polyalkylglutamate applied without mechanical stressing of the coating. Such a coating is produced most conveniently by immersing a partly esterified and stretched filament of polyglutamic acid in a solution of alkylpolyglutamate in a volatile solvent, and thereafter evaporating the solvent. The surface layer of polymeric ester may be built up to a desired thickness by repeating the steps of immersion and drying. Other conventional coating procedures may obviously be resorted to.

Esters of the lower alkanols with polyglutamic acid or with copolymers of glutamic acid and other physiologically tolerated amino acids are most suitable as coating materials for the partly esterified and stretched polyglutamic acid filaments. The methyl and ethyl esters combine the advantages of low cost, excellent tissue compatibility and solubility in solvents which do not readily attack the partly esterified polymers and copolymers of glutamic acid, such as the lower alkyl halides.

Preferred solvents for the coating solutions include dichloromethane, chloroform and dichloroethane. The concentration of the poly-$\gamma$-alkyl-L-glutamate in the solvent may be varied to suit specific operating conditions but a concentration between 1 and 15% permits convenient control of coating thickness, even with very simple equipment. The coating thickness influences the swelling behavior of the partly esterified glutamic acid polymer or copolymer filaments, their rate of absorption in the body and the wet tenacity of the sutures made from the filaments.

The following examples are further illustrative of the invention, and of the influence of process variables on the properties of the sutures produced. It will be understood that the invention is not limited to the examples.

*Example 1*

4 denier filaments of polyglutamic acid were prepared by spinning a solution of sodium L-polyglutamate into an acid coagulating bath. Twenty-five filaments were combined into a thread, and pieces of the thread were immersed in 1-normal solutions of sulfuric acid in ethanol for the periods and at the temperatures indicated in Table 1.

The partly esterified polyglutamic acid threads were washed until free of alcohol and acid, and dried. Six threads produced in each run were combined into organzine of the ASTM designation denier 200, $f$ 50, Z 1220×3, S 670 t.p.m. The intestinal tracts of dogs were then sutured with samples of organzine, and the sutures were inspected from time to time and specimens thereof were removed for testing their tensile strength.

The degree of esterification of the threads is indicated in Table 1 in percent of the originally available carboxyl radicals. Esterification was determined by the method of Zeisel. Table 1 also lists the number of days in which the tensile strength of an implanted organzine sample was reduced to one half of the original value, and this number is characteristic of the durability of the material. The table further lists the number of days after which the sutures were absorbed.

TABLE 1

| Run No. | Esterification Temp., °C. | Esterification Time, min. | Degree of Esterification, percent | Durability, Days | Absorption time, days |
|---|---|---|---|---|---|
| 1 | 20 | 60 | 7.1 | 1 | 2 |
| 2 | 20 | 240 | 22.9 | 1 | 3 |
| 3 | 80 | 10 | 26.8 | 2–3 | 7 |
| 4 | 80 | 20 | 32.5 | 6–10 | 18 |
| 5 | 80 | 40 | 39.3 | 10–14 | 40 |
| 6 | 80 | 60 | 43.1 | 34–18 | 50 |
| 7 | 80 | 120 | 54.0 | 18–21 | 60 |
| 8 | 20–80 / 80 | 10 / 10 | 29.9 | 10–14 | 21 |
| 9 | 20–80 / 80 | 20 / 20 | 35.0 | 14–18 | 40 |

The table indicates that the degree of esterification provides approximate guidance as to the durability to be expected from a partly esterified polyglutamic acid suture. The overall degree of esterification, however, does not in itself determine the durability of a suture as is evident from comparison of runs Nos. 4 and 8, and Nos. 5 and 9. In both instances, the suture having the lower degree of esterification has the higher durability. This is believed due to the different distribution of the ethoxy groups in the threads. The threads produced in runs Nos. 8 and 9 were also distinctly stiffer than those obtained in runs Nos. 4 and 5.

The degree of esterification achieved is a function of time and temperature. At room temperature, esterification is very slow. Esterification at 80° C. for 40–60 minutes under the conditions of this example produced a durability and absorption time which are most desirable in normal surgical practice, but the same properties are produced by treatment at different temperatures and/or for different periods with other filamentous polyglutamic acid material, depending on the mechanical treatment prior to esterification.

*Example 2*

Poly-L-glutamic acid thread was prepared from 25 4-denier filaments having a tenacity of 2 grams per denier. The thread was cut into 90 meter lengths which were each immersed in 100 grams of a 1-normal solution of sulfuric acid in ethanol. The temperature of the solution was raised from room temperature to 80° C. over a period of 20 minutes, and kept constant at 80° C. for an additional 30 minutes. The solution was then cooled, and the thread was removed, washed with water, and dried. Organzine was made from six threads (150 filaments) to the A.S.T.M. designation denier 200, f. 50, Z 1220×3, S 670 t.p.m.

The organzine was used for suturing the intestinal canal of dogs. When sampled after five days, the sutures had not suffered a significant loss of tensile strength. After two weeks, the sutures had lost about one half of their original tensile strength and their appearance had changed. After six weeks, the sutures were almost completely absorbed.

*Example 3*

Polyglutamic acid filaments produced in the manner described in Example 4 were esterified in 1-normal alcoholic sulfuric acid solution at 80° C. for the periods indicated in Table 2. The filaments were stretched before and/or after esterification by a total of 200%. The denier count of the filaments after the second stretching treatment, if any, is given in the table together with their dry tenacity and dry elongation.

TABLE 2

| Run No. | First Stretching, Percent | Esterification | | Second Stretching, Percent | Denier | Dry Tenacity, g./denier | Dry Elongation, Percent |
| --- | --- | --- | --- | --- | --- | --- | --- |
| | | Time, min. | Degree, percent | | | | |
| 1 | 0 | 1 | 63 | 200 | 2.1 | 2.57 | 13.5 |
| 2 | 10 | 1 | 58 | 190 | 1.9 | 2.70 | 12.0 |
| 3 | 25 | 1 | 60 | 175 | 2.2 | 2.58 | 10.8 |
| 4 | 30 | 3 | 57 | 170 | 2.0 | 2.63 | 11.0 |
| 5 | 45 | 4 | 58 | 155 | 1.8 | 2.39 | 13.1 |
| 6 | 50 | 7 | 56 | 150 | 2.2 | 2.45 | 12.5 |
| 7 | 100 | 35 | 58 | 100 | 2.3 | 2.01 | 10.3 |
| 8 | 150 | 120 | 61 | 50 | 2.0 | 1.75 | 11.5 |
| 9 | 200 | 240 | 53 | 0 | 2.4 | 1.53 | 10.0 |

The degree of esterification in the ten runs listed in Table 2 varies over a relatively narrow range in a random manner so that no significant error is introduced by neglecting the differences in degree of esterification. The time in which this degree of esterification is reached is seen to be directly related to the amount of stretching to which the filaments were subjected prior to esterification.

The combined amount of stretching of each filament before and after esterification is the same. Dry tenacity drops off quite sharply when stretching before esterification exceeds 100%, and it should preferably be held below 50% for sutures having best strength. The strength of the material produced in runs Nos. 1 to 4 is approximately uniform within the limits of measurement error, and run No. 5 still shows good strength of the ultimate product. In these runs, esterification was completed within less than ten minutes, and the tenacity of the esterified product was closely similar to that of the material when not subjected to esterification.

This was determined by stretching portions of the filament material employed in runs Nos. 3 and 5 to 200% without esterification. The stretched materials had tenacities of 2.55 grams per denier and 2.25 grams per denier respectively. Their dry elongations were 11.1 and 12.5% respectively.

*Example 4*

An aqueous 20% solution of sodium poly-L-glutamate was spun from a spinneret having 25 apertures of 0.05 mm. diameter into an aqueous spinning bath containing 10% sulfuric acid and 5% sodium sulfate. The spinning speed was 50 meters per minute. The resulting filament of polyglutamic acid was stretched 10%, washed with water, squeezed to remove adhering water, and passed through a 1-normal solution of sulfuric acid in ethanol at 80° C. The dwell time in the ethanol solution was one minute.

The partly esterified material was stretched 190% between godet wheels while immersed in water at 30° C., and passed over a drying roller. The filament so obtained had a weight of 1.9 denier, a dry tenacity of 2.70 grams per denier, a dry elongation of 12.0 percent, and its degree of esterification was 58 mole percent.

*Example 5*

A filament was produced in the manner of Example 4, stretched 30 percent, washed with water, squeezed dry, and passed through a 1-normal solution of phosphoric acid in methanol. The dwell time of the filament in the esterification bath was 3 minutes at 80° C. The partly esterified filament was stretched 170% while immersed in water at 30° C., and dried. Its weight was 2.0 denier, its dry tenacity 2.70 grams per denier, the dry elongation 10.2%, and the degree of esterification 70 percent.

*Example 6*

An aqueous 15% solution of the sodium salt of a copolymer of L-glutamic acid and L-alanine (50:50) was spun from the spinneret described in Example 4 at a speed of 40 meters per minute into a precipitating bath containing 10% sulfuric acid and 5% sodium sulfate in aqueous solution. The filament produced was stretched 15%, washed, squeezed dry, and passed through an esterification bath of ethanol normal with respect to sulfuric acid. The bath had a temperature of 50° C. and the dwell time of the filament was two minutes.

The partly esterified filament was stretched 185% in water at 40° C., and withdrawn by means of a godet. It was dried on a roller. The filament obtained had a weight of 2.2 denier, a dry tenacity of 1.60 grams per denier, a dry elongation of 14.5%, and an ester content of 63 percent.

Filaments of the copolymer which by-passed the esterification solution and were thus stretched first 15% and then 185% without intervening esterification had a weight of 1.9 denier, a dry tenacity of 1.61 grams per denier, and a dry elongation of 13.8%.

*Example 7*

A yarn composed of 25 filaments consisting of polyglutamic acid was esterified to 60% with ethanol in the manner described in the preceding examples. It was stretched after esterification until its weight was 50 denier and the dry tenacity 3.20 grams per denier.

The yarn was passed at a speed of 30 meters per minute through a tank ten meters long and containing a 3% solution of poly-γ-ethyl-L-glutamate in chloroform at a temperature of 30° C. The polyethylglutamate had a degree of polymerization of 2,300. The solution adhering to the yarn leaving the tank was dried with hot air, and three additional layers of polyethylglutamate were deposited on the yarn by successive passes through the chloroform solution, followed by drying. After the last pass, the coated material was spooled for storage.

The effect of the polyethylglutamate coating on the yarn is evident from the following table.

TABLE 3

|  | Uncoated yarn | Coated yarn |
|---|---|---|
| Weight, denier | 50 | 53 |
| Dry tenacity, grams per denier | 3.20 | 3.29 |
| Wet tenacity, grams per denier | 2.35 | 3.13 |
| Dry elongation, percent | 13.8 | 13.7 |
| Wet elongation, percent | 14.0 | 14.0 |
| Young's modulus, grams per denier | 48 | 79.5 |
| Degree of swelling in water (Note 1) | 41.2 | 12.1 |

Note 1: The degree of swelling in water was evaluated by immersing the yarn in water for 24 hours, centrifuging it under arbitrary, but uniform and reproducible conditions, and determining the water retained in percent of dry weight of the yarn prior to immersion.

The coated yarn was implanted in the abdominal cavity of a dog. It retained one half of its original tensile strength for seven days, and was almost completely absorbed after 40 days.

*Example 8*

A multifilament yarn suitable for use as a suture was prepared from a 50 denier yarn of 25 polyglutamic acid filaments ethylated to a degree of esterification of 55%. The partly esterified yarn was immersed in a 5 percent by weight solution of polyethylglutamate in dichloromethane for one minute and then dried. A sample was taken, and the remainder of the material was again immersed and dried. The procedure was repeated until samples having received 0, 1, 3, and 5 successive surface layers of the polyethylglutamate were available. Comparative tests performed on the samples had the results tabulated in Table 4. The degree of swelling and durability were determined as in Examples 7 and 1 respectively.

TABLE 4

|  | Number of coating layers | | | |
|---|---|---|---|---|
|  | 0 | 1 | 3 | 5 |
| Dry tenacity, g./denier | 3.31 | 3.32 | 3.35 | 3.37 |
| Wet tenacity, g./denier | 2.32 | 3.02 | 3.15 | 3.27 |
| Dry elongation, percent | 13.1 | 13.0 | 13.4 | 13.2 |
| Wet elongation | 14.3 | 13.8 | 13.5 | 13.3 |
| Young's modulus, g./denier | 48.3 | 75.9 | 84.4 | 90.1 |
| Degree of swelling, percent | 43.8 | 12.9 | 11.7 | 10.6 |
| Durability, days | 2 | 5 | 7 | 10 |
| Absorption time, days | 25 | 25 | 30 | 35 |

The relatively small increase in the time required for substantially complete absorption of the coated sutures contrasts with the greatly increased durability. An increase in durability by 500% is accompanied by an increase in absorption time of only 67%. It will be noted from Table 1 that durability and absorption time are affected in approximately the same manner by the degree of esterification. The partial esterification of the polymeric amino acid base and the subsequent coating with fully esterified material thus provides a large measure of independent control of durability and absorption.

The suture material of the invention may be produced in a single continuous operation by combining the several processing steps in a manner conventional in itself. The necessary raw materials are a soluble salt, such as the sodium salt, of a peptide polymer or copolymer of glutamic acid, an acid coagulating bath, an acid alcoholic esterification solution, and a coating solution of an ester of polyglutamic acid or of a copolymer of glutamic acid with another physiologically tolerated amino acid in a volatile solvent.

A solution of the sodium polyglutamate is continuously extruded through a spinneret into the coagulating bath. The polyglutamic acid filaments thereby produced are prestretched to a limited extent, passed through the esterification solution to produce the desired degree of esterification, stretched a second time to the necessary tenacity, and are then alternatingly passed through the coating solution and through a drying oven until the desired thickness of polyglutamic acid ester is deposited.

For best stability of the sutures, we prefer to employ as a final coating an ester of polyglutamic acid (or of a copolymer of glutamic acid) with the alcohol used in the esterification process.

While the invention has been described with particular reference to specific embodiments, it is to be understood that it is not limited thereto, but is to be construed broadly and restricted solely by the scope of the appended claims.

What we claim is:

1. A filament of a macromolecular copolypeptide consisting essentially of the copolymerization product of (1) L-glutamic acid and (2) at least one other amino acid selected from the group consisting of L-valine and L-alanine, with the proviso that from 7 to 70 percent of the carboxyl hydrogen in the glutamic acid moiety have been replaced by lower alkyl radicals, the percentage of said lower alkyl radicals being substantially higher at the surface of said filament than in the interior thereof.

2. A filament of a macromolecular polypeptide consisting essentially of the polymerization product of glutamic acid, with the proviso that from 7 to 70 percent of the carboxyl hydrogen in the glutamic acid moiety have been replaced by lower alkyl radicals, the percentage of said lower alkyl radicals being substantially higher at the surface of said filament than in the interior thereof.

3. A filament as set forth in claim 1, further comprising a surface coating essentially consisting of a lower alkyl ester of a polymeric material selected from the group consisting of polyglutamic acid and copolymers of glutamic acid with another amino acid of said group.

4. A surgical suture of a macromolecular copolypeptide consisting essentially of the copolymerization product of (1) L-glutamic acid and (2) at least one other amino acid selected from the group consisting of L-valine and L-alanine, with the proviso that from 7 to 70 percent of the carboxyl hydrogen in the glutamic acid moiety have been replaced by lower alkyl radicals, the percentage of said lower alkyl radicals being substantially higher at the surface of said suture than in the interior thereof.

5. A surgical suture of a macromolecular polypeptide consisting essentially of the polymerization product of glutamic acid, with the proviso that from 7 to 70 percent of the carboxyl hydrogen in the glutamic acid moiety have been replaced by lower alkyl radicals, the percentage of said lower alkyl radicals being substantially higher at the surface of the said suture than in the interior thereof.

6. A filament as set forth in claim 2, further comprising a surface coating essentially consisting of a lower alkyl ester of a polymeric material selected from the group consisting of polyglutamic acid and copolymers of glutamic acid with another amino acid selected from the group consisting of L-valine and L-alanine.

References Cited

UNITED STATES PATENTS

| 2,866,783 | 12/1958 | Bovarnick | 260—112 |
| 2,226,529 | 12/1940 | Austin | 128—335.5 |
| 2,644,773 | 7/1953 | Hammer et al. | 117—141 |
| 2,692,247 | 10/1954 | Graham | 260—78 |
| 3,004,004 | 10/1961 | Fox | 260—78 |
| 3,089,749 | 5/1963 | Ballard | 260—78 |
| 3,119,794 | 1/1964 | De Vries et al. | 260—78 |
| 3,187,752 | 6/1965 | Glick | 128—335.5 |

FOREIGN PATENTS

| 586,801 | 4/1947 | Great Britain. |
| 747,901 | 4/1956 | Great Britain. |

WILLIAM H. SHORT, *Primary Examiner.*

DALTON L. TRULUCK, *Examiner.*

H. D. ANDERSON, *Assistant Examiner.*